Figure 1:
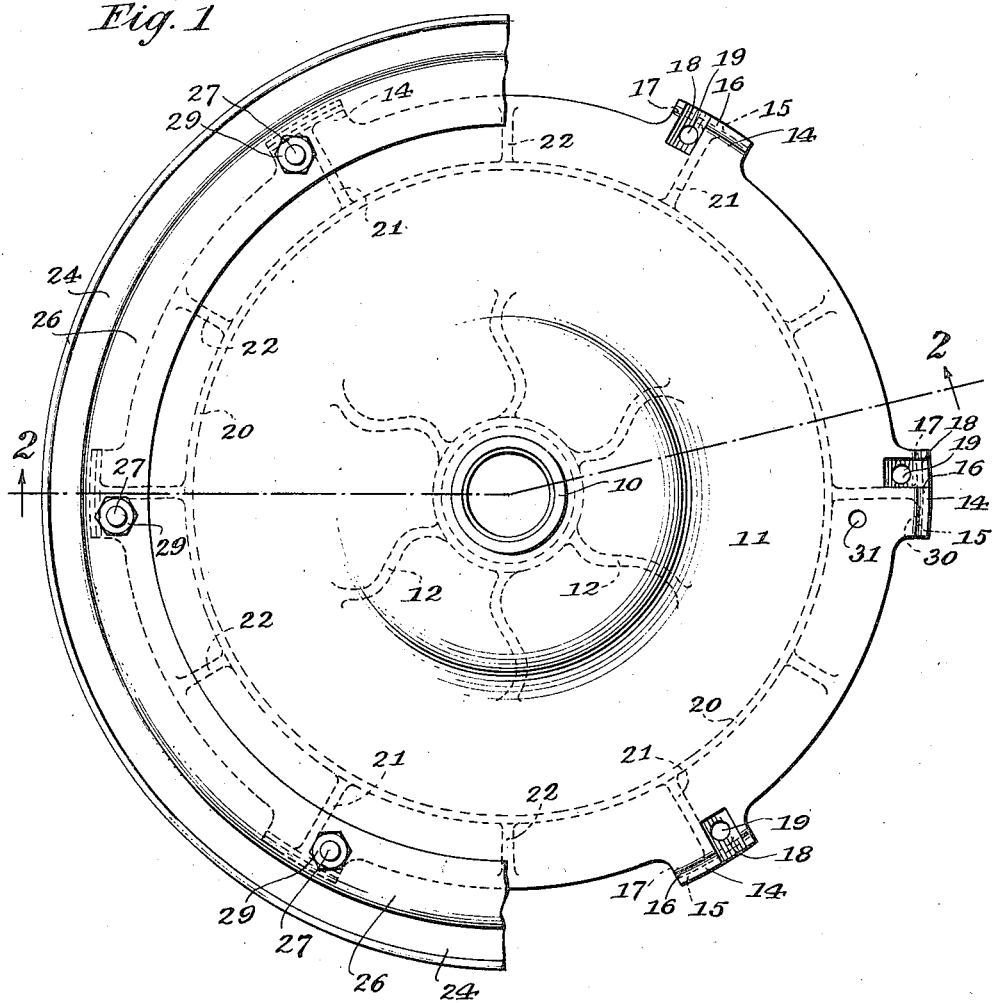

Sept. 28, 1926.

T. R. DAVIS 1,600,978

CAST METAL VEHICLE WHEEL

Filed Feb. 26, 1925

INVENTOR.
Thomas R. Davis
BY
Chamberlain & Newman ATTORNEYS.

Patented Sept. 28, 1926.

1,600,978

UNITED STATES PATENT OFFICE.

THOMAS RICE DAVIS, OF FAIRFIELD, CONNECTICUT, ASSIGNOR TO THE EASTERN MALLEABLE IRON CO., OF BRIDGEPORT, CONNECTICUT, A CORPORATION OF CONNECTICUT.

CAST-METAL VEHICLE WHEEL.

Application filed February 26, 1925. Serial No. 11,674.

This invention relates to an improved metal vehicle wheel, and is a continuation in part of my co-pending application Serial Number 716,585, filed May 29, 1924, an object being to provide such a wheel of disc type, in the form of a single casting, and a demountable tire carrying rim, adapted to be secured to the periphery of the disc wheel structure.

Another object is to provide a wheel structure of relatively great strength, so as to withstand torsional, weight and side strains, and which will at the same time be of extremely light weight, as compared with cast wheels heretofore in use.

A further object is to provide in such a wheel structure a plurality of spaced rim supporting means integral therewith, and so designed as to provide adequate support for the rim, and at the same time not add greatly to the weight of the wheel.

Another object is to provide a cast wheel structure of semi-disc-semi-spoke type, having a closure ring adapted to close and bridge the spaces provided by the spoke structure, so that an entirely closed disc effect is produced, said ring also functioning as a retaining ring for the demountable tire carrying rim, so that the usual rim lugs are dispensed with.

A still further object is to provide a wheel having an integral brake drum, adapting the same to use as either a front or rear brake-equipped wheel, and also to provide an improved co-relative brake and wheel structure in which the brake is centralized with respect to the central plane of rotation of the wheel, so that the most efficient braking is obtained, this being particularly important with front wheel brakes.

With the above and other objects in view, an embodiment of the invention is shown in the accompanying drawings, and this embodiment will be hereinafter more fully described with reference thereto, and the invention will be finallly pointed out in the claims.

Figure 2:
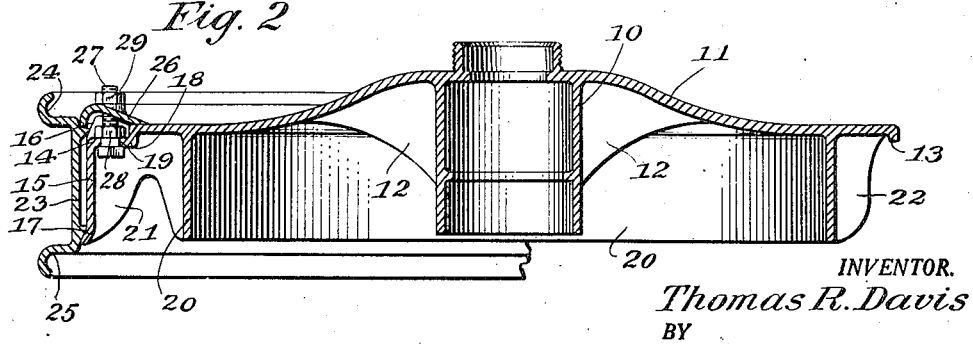

In the drawings:

Fig. 1 is a front elevation of a cast wheel, according to the invention, adapted for front axle use, and showing the rim partially broken away; and Fig. 2 is a transverse sectional view thereof, taken along the line 2—2 of Fig. 1.

Similar reference characters indicate corresponding parts.

Referring to the drawings, the embodiment of the invention shown therein comprises a hub 10, illustrated as adapted for use upon the front axle spindles of an automobile, but which may be designed for rear axle use, and a plate or web portion 11 formed integrally with the hub, and curved rearwardly from its point of connection to a relatively flat marginal portion, radial reinforcing ribs 12 being formed integrally between the hub and the inner surface of the web.

At its periphery the web is provided with a relatively small bead 13 (Fig. 2), and at a plurality of equally spaced points there are provided radial extension portions 14 having inwardly extending rim seats 15 formed integrally therewith, being slightly beveled at their forward ends, as at 16, and flared outwardly at their rearward ends, as at 17, for seating engagement therewith of the rim, as will presently more fully appear. The extension portions 14 are furthermore each provided with a recessed portion 18 having a hole 19 therein for engagement of the rim retaining bolts.

In inwardly spaced relation to its periphery the web is provided at its inner surface with an annular cylindrical brake drum portion 20, formed integrally therewith, reinforced by radial ribs 21 extending between the same and the rim seats 15, and which also reinforce the said seats, and also by reinforcing ribs 22 provided centrally between the ribs 21.

The flanged tire supporting rim 23 is provided at its inner surface and adjacent the forward and rearward flanges with annular flange ribs 24 and 25, adapted to seat upon the beveled portions 16 and the flanged portions 17 of the rim seats, respectively. The rim 23 is secured by a continuous retaining ring 26 bearing upon the front surface of the web and the flange rib 24 of the rim, and held by bolts 27 secured in the holes 19 of the web by lock nuts 28, and clamping nut 29 upon the bolts and bearing on the ring to secure the latter and rim in position. This ring 26 closes the peripheral spaces of the web portion between the extension portions 14 so that a solid disc structure is presented.

One of the rim seats is preferably provided with an aperture 30 for the tire valve stem, and an opening 31 is furthermore provided in the web for the end of the stem, which is bent at a right angle, to project through said opening 31.

It will be noted that the brake drum is circumferentially aligned with the rim, and that the central plane of rotation of the tire, and therefore the point of contact with the ground, passes centrally through the brake drum, so that the braking resistance is applied in direct line with the torsional moment of the wheel, and the maximum braking efficiency is thus obtained. This is particularly important with front wheels, where any off-center resistance is apt to impair the steering of the wheels.

While I have illustrated the wheel provided with an integral brake drum, it will be understood that the invention is susceptible of use without the brake drum, and further that any desired type of hub, either front or rear, may be employed.

The wheel, according to my invention, may be cast by simple and efficient casting methods, and a light strong structure is provided. The provision of the spaced extension portions 14 and the closing ring 26 produces a solid disc structure, which at the same time is extremely light in weight.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:—

1. In a vehicle wheel, a casting including an integral hub and web structure, said web structure including spaced radial extension portions formed integrally therewith, rim seats formed integrally upon the ends of said extension portions, a demountable rim engaged upon said rim seats, and a retaining ring secured to said web structure bridging and closing the spaces between said extension portions and retaining said rim upon said seats.

2. In a vehicle wheel, a casting including an integral hub and web structure, said web structure including spaced radial extension portions formed integrally therewith, rim seats formed integrally upon the ends of said extension portions, extending inwardly in substantially parallel relation to the axis of the wheel, a demountable rim engaged upon said rim seats, and a retaining ring secured to said web structure bridging and closing the spaces between said extension portions and retaining said rim upon said seats.

3. In a vehicle wheel, a casting including an integral hub and web structure, said web structure including spaced radial extension portions formed integrally therewith, rim seats formed integrally upon the ends of said extension portions and provided with forward beveled seating surfaces, a demountable rim engaged upon said rim seats, and a retaining ring secured to said web structure bridging and closing the spaces between said extension portions and retaining said rim upon said seats.

4. In a vehicle wheel, a casting including an integral hub and web structure, said web structure including spaced radial extension portions formed integrally therewith, rim seats formed integrally upon the ends of said extension portions extending inwardly in substantially parallel relation to the axis of the wheel and provided rearwardly with outwardly extending flange portions, a demountable rim engaged upon said rim seats, and a retaining ring secured to said web structure bridging and closing the spaces between said extension portions and retaining said rim upon said seats.

5. In a vehicle wheel, a casting including an integral hub and web structure, a brake drum formed integrally upon the inner side of said web structure in annularly spaced relation to said hub, said web structure including spaced radial extension portions formed integrally therewith, rim seats formed integrally upon the ends of said extension portions, a demountable rim engaged upon said rim seats, and a retaining ring secured to said web structure bridging and closing the spaces between said extension portions and retaining said rim upon said seats.

6. In a vehicle wheel, a casting including an integral hub and web structure, a brake drum formed integrally upon the inner side of said web structure in radially spaced relation to said hub, said web structure including spaced radial extension portions formed integrally therewith, rim seats formed integrally upon the ends of said extension portions, radial reinforcing ribs formed integrally between said rim seats, extension portions and web and the outer surface of said brake drum, a demountable rim engaged upon said rim seats, and a retaining ring secured to said web structure bridging and closing the spaces between said extension portions and retaining said rim upon said seats.

7. In a vehicle wheel, a casting including an integral hub and web structure, said web structure including spaced radial extension portions formed integrally therewith, rim seats formed integrally upon the ends of said extension portions, said extension portions being respectively provided with retaining bolt receiving holes adjacent each rim seat, a demountable rim engaged upon said rim seats, a retaining ring bridging and closing the spaces between said extension portions and engaging said rim in retaining relation, and retaining bolts engaged in said holes and adapted to secure said ring.

Signed at Bridgeport in the county of Fairfield and State of Connecticut this 24 day of February A. D. 1925.

THOMAS RICE DAVIS.